United States Patent [19]

McCormick et al.

[11] 3,990,308
[45] Nov. 9, 1976

[54] TEMPERATURE MEASUREMENT SYSTEM FOR FREE TURBINE TYPE GAS TURBINE ENGINES

[76] Inventors: Robert Ian McCormick, 1845 du Bocage, St. Bruno, Quebec; Gudmundur Peter Peterson, 640 Montcalm, St. Hilaire, Quebec, both of Canada

[22] Filed: May 27, 1975

[21] Appl. No.: 580,918

Related U.S. Application Data

[63] Continuation-in-part of Ser. No. 418,433, Nov. 23, 1973, abandoned.

[52] U.S. Cl. .................................. 73/340; 73/341; 73/342
[51] Int. Cl.² ................................. G01K 13/00
[58] Field of Search ............. 73/340, 341, 342, 346; 60/39.28 T, 39.16 R, 39.24

[56] References Cited
UNITED STATES PATENTS

| | | | |
|---|---|---|---|
| 2,463,566 | 3/1949 | Saldin | 73/341 |
| 2,796,733 | 6/1957 | Pearl et al. | 60/39.28 T |
| 3,019,604 | 2/1962 | Hall | 60/39.28 T |
| 3,098,356 | 7/1963 | Joline | 60/39.16 R |

Primary Examiner—James J. Gill
Assistant Examiner—Anthony V. Ciarlante

[57] ABSTRACT

A temperature measurement system for free turbine type gas turbine engines comprising first temperature sensing means located in the engine exhaust area for sensing the engine exhaust temperature and providing an electrical signal representative thereof. A second temperature sensing means is located in the intake area of the engine for sensing the engine intake temperature and providing a further electrical signal representative thereof. Both of these electrical signals are connected to a compensator circuit having a function to produce a resultant output signal which is directly proportional to the temperature in the inlet area of the turbine of the engine.

9 Claims, 3 Drawing Figures

TEMPERATURE MEASUREMENT SYSTEM FOR FREE TURBINE TYPE GAS TURBINE ENGINES

The Invention herein described was made in the course of or under a contact or sub-contract thereunder, (or grant) with the Department of the Navy.

This application is a continuation-in-part of application Ser. No. 418,433, filed on Nov. 23, 1973, now abandoned.

BACKGROUND OF THE INVENTION a. Field of the Invention

The present invention relates to a temperature measurement system for free turbine type gas turbine engines and more particularly, but not exclusively, for gas turbine engines of relatively low forward speed applications.

b. Description of Prior Art

In order to maintain gas turbine engine operation within safe limits and to ensure adequate life of the hot components, it is required to monitor or control the turbine inlet temperature. Current means of indirectly determining turbine inlet temperature involve the measurement of temperature at three locations, namely, engine inlet, compressor delivery and engine exhaust. This arrangement, where the temperature at the turbine inlet is obtained by simple addition and/or subtraction of the three temperature measurements, is applicable only to turbojet engines where virtually all the output of the turbine is consumed within the engine. For turboprop or turboshaft engines, where a substantial amount of energy is used for external work, some allowance must be made to the temperature in the exhaust area. The configuration of some gas turbine engines is such that sensing turbine inlet temperature is impractical or very difficult, particularly for maintenance reasons because of inaccessability of the temperature probes and harness in this area. Also, the heat at the turbine inlet area is too severe for good thermocouple life. In a free turbine engine, the measurement of the turbine inlet area temperature is also not so easily obtained because of power variations possible at the free turbine in relation to the fixed compressor turbine.

SUMMARY OF INVENTION

It is a feature of the present invention to provide a temperature measurement system which substantially overcomes the above mentioned disadvantages of accessability for installation and maintenance, and life of the temperature sensing probes.

It is a further feature of the present invention to provide a temperature measurement system having a novel means of determining turbine inlet area temperature for free turbine type engines.

According to the above features, from a broad aspect, the present invention provides a temperature measurement system for gas turbine engines having a free turbine, said engine having an intake area and an exhaust area and at least one turbine mounted on a shaft attached to a compressor and at least one turbine mounted on a drive shaft or propeller shaft free to rotate in the exhaust area, said turbine each having an inlet area, said system comprising first temperature sensing means located in said engine exhaust area for sensing the engine exhaust temperature and providing an electrical signal representative thereof, a second temperature sensing means located in said intake area for sensing the engine intake temperature and providing a further electrical signal representative thereof, said engine exhaust temperature being subject to temperature variations due to power variations in said free turbine and independent of inlet temperature, both said electrical signals being connected to a compensator circuit having a function to produce a resultant output signal which is directly proportional to the temperature in the inlet area of said turbine.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
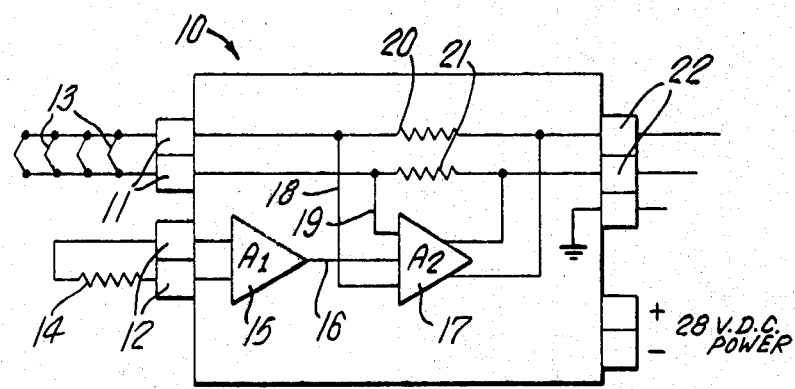
FIG. 1 is a schematic diagram of the system of the present invention.

Referring now to the drawings and more particularly to FIG. 1, there is shown the system of the present invention as comprising a compensator circuit 10 having a first input connection 11 and a second input connection 12. First temperature sensing means, herein shown as thermocouple probes 13, are connected in parallel across the input connection 11. The thermocouple probes 13 are chromel-alumel thermocouples secured in the exhaust port of a gas turbine engine (FIG. 3) and provide an input signal to the compensator circuit 10 indicative of the engine exhaust temperature. In this application, four thermocouple probes 13 each having two junctions are secured in the exhaust port of the engine FIG. 3) to provide an average temperature reading.

Second temperature sensing means herein shown as a resistance sensing element 14 such as a nickel resistance wire sensor is connected across the second input connection 12 and secured in the engine intake duct (FIG. 3) to provide a further input signal to the compensator circuit 10 indicative of the engine intake temperature.

The compensator circuit 10 provides a non-linear correction of the engine exhaust temperature signal as a function of the engine intake temperature signal. As shown in FIG. 1, the engine intake temperature signal is fed to a signal conditioning amplifier 15 having an output 16 connected to an input of an amplifier 17. The engine exhaust temperature signal is also connected to the amplifier 17 via leads 18 and 19. Resistors 20 and 21 are 4 ohm load resistors for the amplifier 17.

The amplifier 17 amplifies the exhaust temperature signal and modifies it as a non-linear function of the engine intake temperature signal to provide an output signal, across output connections 22, which bears a unique relationship to the temperature at the turbine inlet area of the engine. This output signal is then connected to a visual indicator (not shown), for example a potentiometer or galvanometer instrument calibrated in ° C, whereby to display the modified exhaust gas temperature (EGT) reading whereby to monitor the engine performance.

Figure 2:
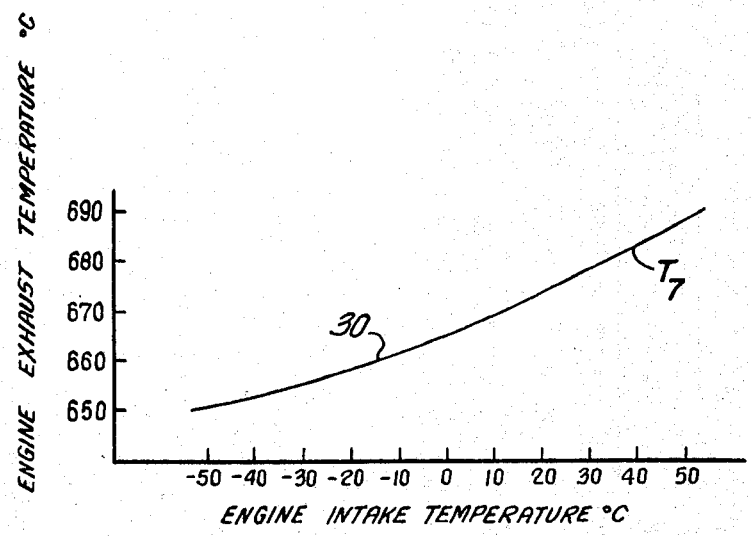
FIG. 2 is a characteristic curve illustrating the principle of the present invention with reference to a known engine characteristic.

Referring to FIG. 2, there is shown the form of a characteristic curve 30 representative of measured exhaust gas temperature ($T_7$) versus the engine intake temperature ($T_1$) for a constant turbine inlet temperature of 1080° C and exhaust gas temperature (EGT) of 600' C. The particular characteristic shown is that of a turboshaft engine, Pratt & Whitney PT6T-3. With this known characteristic form it is possible to determine if the turbine inlet area temperature is within the acceptable range or if there is an engine malfunction.

The output signal of the compensator 10 for the particular engine characteristics described relative to FIG. 2, follows the form, $$EGT = KT_7 + AT_1 + BT_1^2$$

over the range $$T_1 = -50° C \text{ to } +50° C$$
$$T_7 = 400° °C \text{ to } 700° C$$

where EGT is the output signal of the compensator, i.e. the output indication in Mv (millivolts), $T_7$ is the measured engine exhaust gases temperature, $T_1$ is the engine air intake temperature, and K, A, B are fixed constants which are a function of a particular engine and which are determined in part by the choice of the material of the resistance measuring device for sensing the temperature $T_1$.

With the particular engine mentioned above, the output signal may vary with sensed temperatures (on the X and Y axis of FIG. 2) within ± 5° F, under standard conditions and should not vary by more than 8° F under all ambient conditions from 0° to 180° F and not more than +12° from −55° F to 0° F and 180° F to 220° F.

Figure 3:
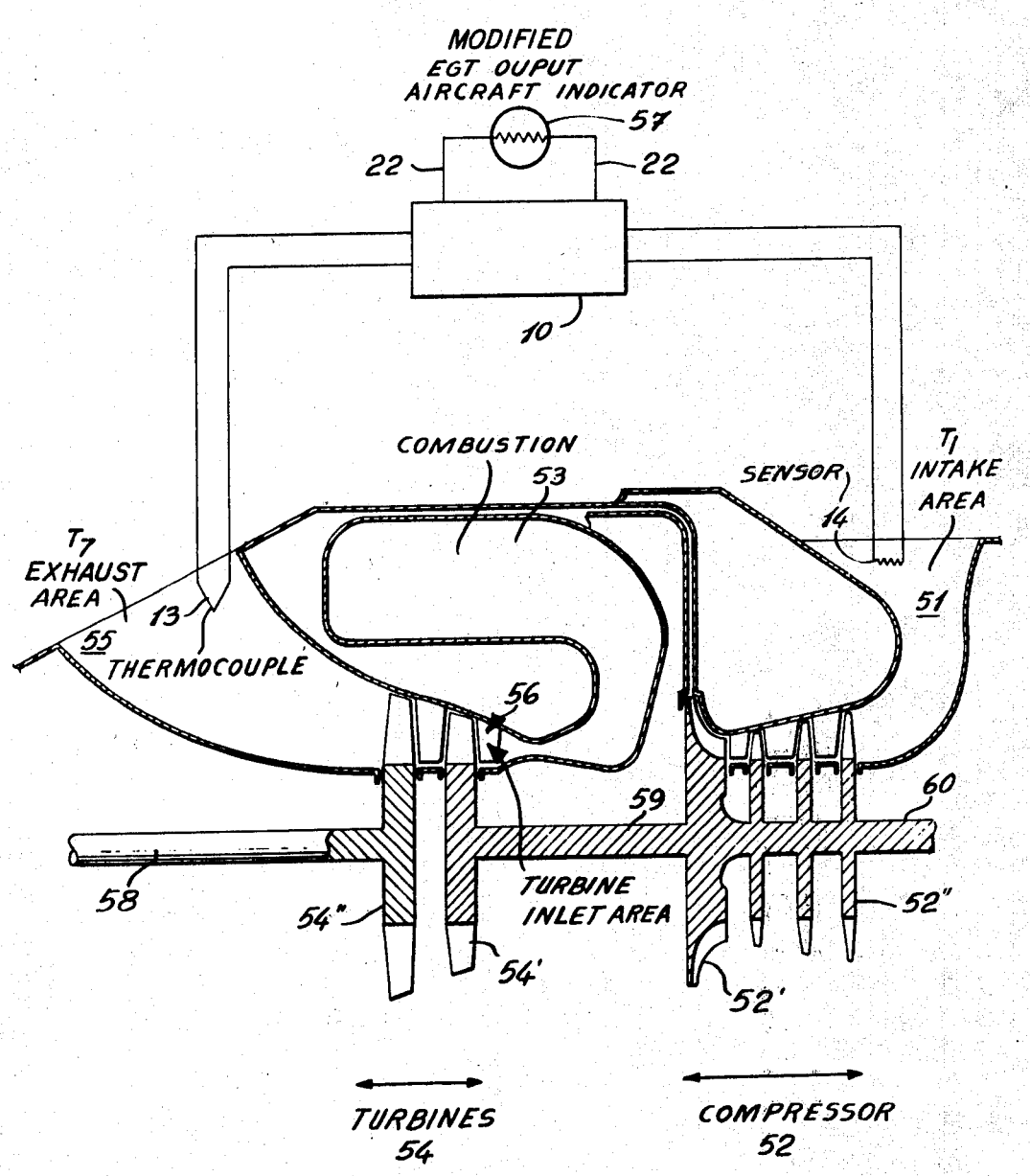
FIG. 3 is a schematic view showing the location of the probes in a gas turbine engine.

FIG. 3 is a schematic illustration of a gas turbine engine 50 showing the intake area 51, the compressor area 52, the combustion area 53, the turbine area 54 and the exhaust area 55. The compressor turbine 54' is fixed to compressors 52' and 52'' by means of a rigid shaft 59 and the power turbine 54'' is mounted on the power or propeller shaft 58. As shown, the thermocouple probe 13 is secured in the exhaust area 55 and the sensing element 14 is connected in the intake area. The turbine inlet area is designated by numeral 56. An indicator 57 is connected across the output connections 22 of the compensator 10 to provide an indication, in millivolts, having a relationship to the temperature at the turbine inlet area of the engine. The PT6T-3 turboshaft engine mentioned above is a free turbine type engine. The free turbine is independent of the compressor turbine and is free to rotate by itself in the engine exhaust gas system. The shaft on which the free turbine is mounted drives a propeller, a pump or a helicopter rotor through a reduction gear system (not shown).

In the specification, when referring to gas turbine engines of relatively low forward speed applications, we refer to stationary and low speed applications of up to about 300 knots. Beyond that speed, temperature errors may become significant. However, these errors can be predetermined and by utilizing a corrective chart, applications beyond these speeds may be made possible. Alternatively, a Mach Number sensing device could be provided in the engine intake area to apply a further correction to the temperature signal. Thus, it may be feasible to utilize the temperature measurement system with high speed engines.

We claim:

1. A temperature measurement system for gas turbine engines having a free turbine, said engine having an intake area and an exhaust area and at least one turbine mounted on a shaft attached to a compressor and at least one free turbine mounted on a drive shaft or propeller shaft free to rotate in the exhaust area, said turbines each having an inlet area, said system comprising first temperature sensing means located in said engine exhaust area for sensing the engine exhaust temperature and providing an electrical signal representative thereof, a second temperature sensing means located in said intake area for sensing the engine intake temperature and providing a further electrical signal representative thereof, said engine exhaust temperature being subjected to temperature variations due to power variations in said free turbine and independent of inlet temperature, both said electrical signals being connected to a compensator circuit having a function to produce a resultant output signal which is directly proportional to the temperature in the inlet area of said turbine.

2. A temperature measurement system as claimed in claim 1 wwherein said compensator circuit has a function within a particular engine exhaust and intake temperature range, following the form $$EGT = KT_7 + AT_1 + BT_1^2$$

where EGT is the resultant output signal of said compensator (i.e. output indication in millivolts) $T_7$ is said engine exhaust gas temperature, $T_1$ is said engine air intake temperature, and K, A, B are fixed constants which are a function of a particular engine.

3. A temperature measurement system as claimed in claim 1 wherein said compensator circuit comprises amplifier means to amplify said signal representative of said engine exhaust temperature and to modify said signal as a non-linear function of said further signal representative of said engine intake temperature.

4. A temperature measurement system for free turbine type gas turbine engines of low forward speed applications, said engine having an intake area, and an exhaust area and at least one turbine mounted on a shaft attached to a compressor and at least one free turbine mounted on a drive shaft or propeller shaft free to rotate in the exhaust area, said turbine each having an inlet area, said system comprising first temperature sensing means located in said engine exhaust area for sensing the engine exhaust temperature and providing an electrical signal representative thereof, a second temperature sensing means located in said intake area for sensing the engine intake temperature and providing a further electrical signal representative thereof, said engine exhaust temperature being subjected to temperature variations due to power variations in said free turbine and independent of inlet temperature, both said electrical signals being connected to a compensator circuit having a function to produce a resultant output signal which is directly proportional to the temperature in the inlet area of said turbine.

5. A temperature measurement system as claimed in claim 4 wherein said compensator circuit has a function within a particular engine exhaust and intake temperature range, following the form $$EGT = KT_7 + AT_1 + BT_1^2$$

where EGT is the resultant output signal of said compensator (i.e. output indication in millivolts) $T_7$ is said engine exhaust gas temperature, $T_1$ is said engine air intake temperature, and K, A, B are fixed constants which are a function of a particular engine.

6. A temperature measurement system as claimed in claim 4 wherein said compensator circuit comprises amplifier means to amplify said signal representative of said engine exhaust temperature and to modify said signal as a nonlinear function of said further signal representative of said engine intake temperature.

7. A temperature measurement system as claimed in claim 4 wherein said first temperature sensing means are chromel-alumel thermocouple probes.

8. A temperature measurement system as claimed in claim 4 wherein said second temperature sensing means is a nickel resistance wire sensor.

9. A temperature measurement system as claimed in claim 4 wherein said engine has a low forward speed application of up to about 300 knots.

* * * * *

UNITED STATES PATENT AND TRADEMARK OFFICE
CERTIFICATE OF CORRECTION

PATENT NO. : 3,990,308
DATED : November 9, 1976
INVENTOR(S) : Robert Ian McCormick and Gudmundur Peter Peterson It is certified that error appears in the above-identified patent and that said Letters Patent are hereby corrected as shown below:

On the Title Page:

Please show the name of the assignee as follows:

Pratt & Whitney Aircraft of Canada Limited,
Longueuil, Quebec, Canada.

Signed and Sealed this

Tenth Day of May 1977

[SEAL]

Attest:

RUTH C. MASON
*Attesting Officer*

C. MARSHALL DANN
*Commissioner of Patents and Trademarks*